Feb. 13, 1968   R. J. HOLTON   3,368,444
SELF-TAPPING FASTENER

Filed Dec. 29, 1965                                   2 Sheets-Sheet 1

INVENTOR.
ROBERT J. HOLTON
BY
Teare, Teare and Sammon
ATTORNEYS

Feb. 13, 1968          R. J. HOLTON          3,368,444
                    SELF-TAPPING FASTENER
Filed Dec. 29, 1965                        2 Sheets-Sheet 2

INVENTOR.
ROBERT J. HOLTON
BY
Teare, Teare and Sammon
ATTORNEYS

United States Patent Office 3,368,444
Patented Feb. 13, 1968

3,368,444
SELF-TAPPING FASTENER
Robert J. Holton, Rocky River, Ohio, assignor to Tinnerman Products, Inc., Cleveland, Ohio, a corporation of Ohio
Filed Dec. 29, 1965, Ser. No. 518,751
13 Claims. (Cl. 85—32)

ABSTRACT OF THE DISCLOSURE

A self-threading fastening device adapted for assembly with a threadless member including, a body having an opening therein. The opening has a continuous axially extending surface having a plurality of arcuate thread-cutting projections which extend radially into the opening and are formed from the material of the body and from cut-out portions made in the axially extending surface. Each thread-cutting projection extends angularly across a respective cut-out portion and has a leading end commencing in the axially extending surface adjacent one side of the cut-out portion and a relatively wider trailing end terminating at the opposite side of the cut-out portion.

---

This invention relates to fastening devices, and more particularly to a self-threading, washer-like fastening device and method of making the same which is adapted for assembly with threadless members, such as studs, screws, bolts and the like.

Heretofore, various types of non-threaded or threadless fastening devices have been employed in the assembly of two or more support members, or in the mounting of an article on a support member by threading it onto a plain (threadless) stud or the like. Such arrangements, to be effective, must combine the desirable properties of strength, rigidity and hardness in order to cut deep, uniform threads in the stud, particularly when the stud is comprised of tough and hard materials. Devices which have heretofore been proposed generally include a stud-receiving opening having various thread-cutting means, such as bent edges, inclined tongues or flexible finger elements, constructed and arranged to cut into the outer surface of the stud to form threads thereon. Though such devices have been suitable for some purposes, they are not satisfactory in many applications, particularly in cases where device having minimum thickness is required. Moreover, the bulky construction of such devices not only limits their usability, but such devices do not combine the necessary strength, rigidity and hardness characteristics for uses which require a minimum thickness, such as when applied in the environment of a washer or the like.

Accordingly, an object of the present invention is to provide a washer-like fastening device of the character described which has a relatively thin cross-sectional thickness, but which combines good strength, rigidity and hardness characteristics for self-threading assembly with a threadless member, such as a stud, screw, bolt or the like.

A further object of the present invention is to provide a washer-like fastening device of the character described which comprises a relatively thin, generally flat body having an opening therein for receiving a threadless member therethrough, and thread cutting means formed from the material of the body and projecting radially inwardly of the opening therein adapted for cutting uniform, helical threads in the threaded member upon rotary installation thereof.

A still further object of the present invention is to provide a novel method for making the washer-like fastening device of the character described.

Other objects and advantages of the invention will be apparent from the following description taken in conjunction with the accompanying drawings, wherein:

FIG. 2A is a graphic line illustration which represents the general contour, in top plan, of the material displaced from the device in forming the thread cutting means shown in FIG. 2;

FIG. 4A is a graphic line illustration which represents the general contour, in top plan, of the material displaced from the device in forming the thread cutting means shown in FIG. 4;

Figure 1:
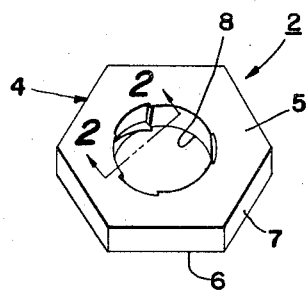
FIG. 1 is a generally perspective view of the self-threading, washer-like fastening device made in accordance with the invention.
Figure 5:
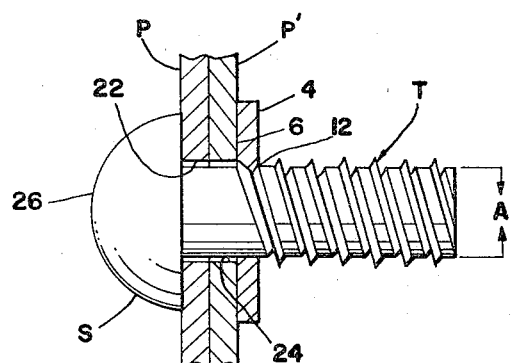
FIG. 5 is a fragmentary assembly view, partly in section, showing the fastening device of FIG. 1 mounted in self-threading engagement on a threadless member for securing two support members in abutting engagement against one another.

Referring now again to the drawings, and in particular to FIGS. 1 and 5, the self-threading, washer-like fastening device, designated generally at 2, is illustrated in one form of the invention mounted in self-threaded engagement on a plain (threadless) member S, such as a stud or the like, for joining two or more apertured support members P and P' in juxtaposed engaged relationship.

As shown, the device 2 includes a base or body 4 which may be made from a single blank or strip of sheet steel. The body 4 preferably has a flat upper surface 5 and a corresponding flat lower surface 6 which extend generally parallel to one another. The body 4 has a polygonal, such as hexagonal, outer peripheral edge surface, as at 7, which provides a bearing area for engagement by a suitable tool (not shown), such as wrench or the like, for turning the device into self-threading engagement with the threadless member S.

Figures 2, 4:
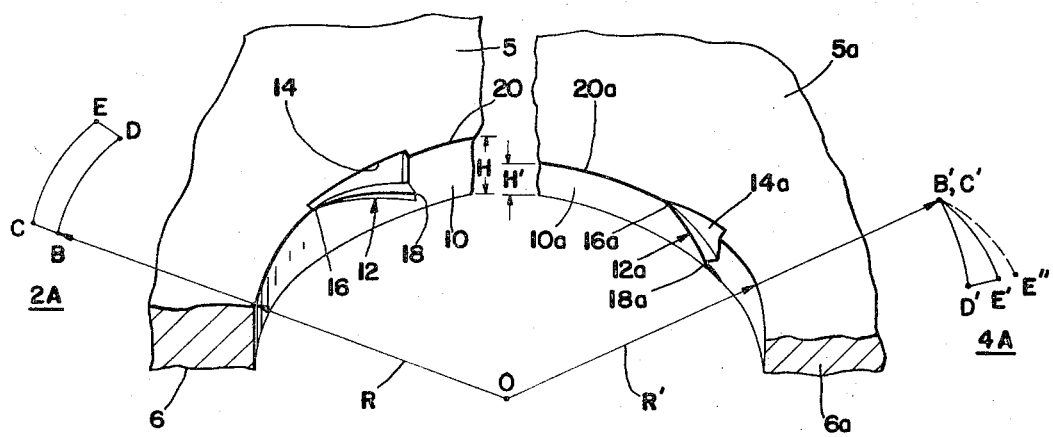
FIG. 2 is an enlarged fragmentary section view taken along the plane indicated by the line 2—2 of FIG. 1, and showing the novel thread cutting means made in accordance with one form of the invention.
FIG. 4 is an enlarged fragmentary section view taken along the plane indicated by the line 4—4 of FIG. 3.

The body 4 of the device is provided with a central opening 8, such as of a circular shape, which is spaced equidistant from the peripheral edge surface 7. The opening 8 has a diameter, as determined by the radius R (FIG. 2), which is preferably slightly greater than the normal maximum diameter A of the threadless member S. The dimension A represents the maximum diameter of the threadless member S prior to the formation of the threads T thereon, as best shown in FIG. 5. As shown in FIG. 2, the body 4 of the device preferably has a thickness H of about $3/32$ inch when the diameter of the opening 8 is about one-quarter inch to provide the necessary strength characteristics, yet to provide a sufficient amount of material for self-threading the device onto the threadless member S, as will hereinafter be more fully described.

In accordance with the form of the invention of FIGS. 1 and 2, the annular interior surface 10 of the opening 8 is provided with a plurality of self-threading means in the form of elongated, generally arcuate projections 12, which are adapted for cutting uniform, helical threads T on the threadless member S. The projections 12 are preferably formed from the material of the body 4 by axially displacing the metal of the interior surface 10, as at 14, by a suitable broaching tool. This axial deformation acts to progressively work-harden the material which imparts to the projections 12 a substantially greater hardness, as compared to the hardness of the material of the body 4, thereby to provide optimum strength and wear resistant characteristics therein.

Figure 2B:
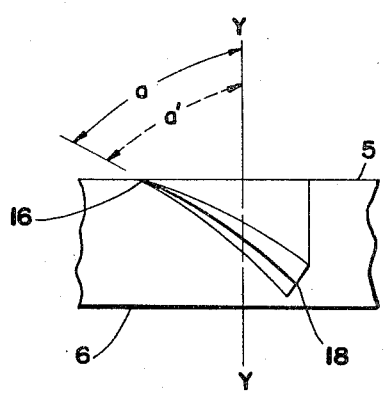
FIG. 2B is an enlarged fragmentary elevation view showing the helical disposition of the thread cutting means with respect to the rotational axis of the device.

The projections 12 are disposed in circumferentially spaced relation with respect to the interior surface 10. Each projection preferably includes a leading end portion 16 which extends generally helically toward a trailing end portion 18. The pitch angle $a$ or helical disposition of each projection 12 from the leading end portion 16 toward the trailing end portion 18 is determined by the angle of the general plane of the projection with respect to the rotational axis Y—Y of the device, as best shown in FIG. 2B. Moreover, by varying the pitch angle, the relative coarseness or fineness of the threads may be readily achieved. Each projection 12 preferably progressively increases in axial thickness and radial width from the leading end portion 16 toward the trailing end portion 18, so that the maximum transverse distance between the trailing end portions 18 of opposed projections is less than the normal maximum diameter A of the threadless member S, by an amount sufficient to cut the desired depth of thread. Moreover, the transverse distance between opposed of the projections 12 progressively diminishes in a direction from the trailing end portions 18 back toward the leading end portions 16 so that the transverse distance between the leading end portions is equal to or slightly greater than the diameter A of the threadless member S. By this arrangement, uniform, helical threads may be readily provided with a minimum of torque or expansive force exerted upon the device.

In FIG. 2A there is graphically illustrated the general contour, as determined—in top plan—by the lines connecting the respective points B, C, D, E, of the swath of material 14 (FIG. 2) displaced axially from the body 4 of the device. The amount of material removed by such displacement may be measured radially outwardly in the plane of the upper surface 5 commencing from the arcuate, segmental line illustrated from B to D which line coincides with the circumferential edge 20 (FIG. 2) of the opening 8. The displacement of the material, in the embodiment shown, is of a uniform character, namely, the distance measured radially along the line from B to C adjacent the leading end portion 16 of the respective projection 12 is approximately equal to the distance measured radially along the line from D to E adjacent the trailing end portion 18. Thus, the arcuate, segmental lines from B to D and from C to E are substantially parallel to one another, and hence, are substantially parallel to the upper circumferential edge 20 of the opening 8. By this arrangement, the projections 12 may be readily displaced from the material of the body 4 commencing in the plane of the upper surface 5 so as to impart thereto any pitch angle, as desired.

Figure 3:
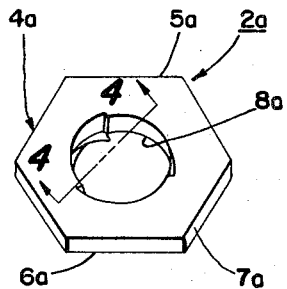
FIG. 3 is a generally perspective view of a modification of the self-threading, washer-like fastening device made in accordance with the invention.

In FIGS. 3 and 4, there is illustrated a modification of the device 2a which is generally similar to that heretofore described with the suffix $a$ and prime (') added to the reference numerals to designate like parts, except that in this form the body 4a preferably has a thickness H' of about $3/64$ inch when the diameter of the opening 8a, as determined by the radius R', is about one-quarter inch. For purposes of comparative illustration, the diameter of the opening 8 of the device of FIG. 1 is the same as the diameter of the opening 8a of the modified device 2a of FIG. 3 so that the radii R and R' are equal to one another as measured from the common center O, as seen by a comparison of FIGS. 2 and 4.

In this form, the body 4a similarly has a flat upper surface 5a and lower surface 6a with a polygonal, such as hexagonal, outer peripheral edge surface 7a for engagement by a suitable tool, as aforesaid. The interior surface 10a of the opening 8a is similarly provided with a plurality of generally arcuate projections 12a formed from the material of the body 4a, as at 14a, which projections taper helically from a leading end portion 16a to a trailing end portion 18a.

FIG. 4A graphically illustrates the general contour, as determined—in top plan—by the lines connecting the points (B', C'), D' and E', of a swath of material 14a displaced axially from the body 4a of the device. Here also, the removed material is measured radially outwardly in the plane of the upper surface 5a commencing from the arcuate, segmental line from B' to D' which coincides with the circumferential upper edge 20a (FIG. 4) of the opening 8a. In this form, however, due to the relative reduction in thickness of the body 4a the displacement of material is not of a uniform radial character. Moreover, the points B' and C' adjacent the leading end portion 16a of the respective projection coincide with one another and with the upper circumferential edge 20a, while the distance measured radially along the line from D' to E' adjacent the trailing end portion 18a is of a predetermined value dependent upon the relative thickness of the body 4a. Thus, the radial distance along the line from E' to E'' (broken line) illustrates the additional displacement of material necessary to provide the projections when the thickness of the body 4a has been further decreased. Accordingly, it can be seen that the arcuate, segmental lines from (B', C') to D' and from (B', C') to E' are disposed at an acute angle with respect to one another and with the line from (B', C') to E' being tangent to the upper circumferential edge 20a at the coincident points (B', C'). Thus the leading end portion 16a being tangent to or at a zero value with respect to the circumferential edge 20a and by selectively increasing and/or decreasing the radial distance from such edge surface adjacent the trailing end portions 18a, helical projections may be effectively provided for generally any given thickness of material without impairment to the strength or torque characteristics of the device. Moreover, the pitch angle $a'$ of the projections 12a in this form, as shown by broken line in FIG. 2B, may be provided in relatively thin materials so as to be substantially equal to the pitch angle $a$ of projections 12 made from materials of relatively greater thickness, such as shown in FIG. 1. It is to be understood, however, that with very thin materials, the pitch angle would be correspondingly decreased so as to cut fine pitch threads on a threadless member.

In application, the operation of the device illustrated in FIG. 3 is generally similar to that illustrated in FIG. 1 so that the following description of such operation will proceed with reference to the embodiment shown in FIG. 1. Moreover, as shown in FIG. 5, the support members P and P' may be disposed in side-by-side relationship with the apertures 22 and 24 therein disposed in registration with one another so as to receive the threadless member S. Thus positioned, the fastening device 2 may then be inserted onto the end of the threadless member S and turned down in the direction toward the support member P' by means of a suitable tool (not shown) being brought into turning engagement with the outer edge surface 7. As the device 2 is being turned down, the projections 12 progressively cut into the threadless member S so as to displace material therefrom to form the uniform, helical threads T along its axial length. The device is turned down until the lower surface 6 thereof is disposed in engagement with the confronting surface of the support member P', whereby the juxtaposed support member P and P' are held in firm abutting engagement against one another between the head portion 26 of the now threaded member S and the body 4 of the device. Thus, the projections 12 which substantially angularly transpose the thickness of the body 4 act to provide reinforcement ribs which prevent any distortion or warping of the body 4 as it is drawn into tight washer-like, gripping engagement against the confronting surface of the support member P'.

In FIGS. 6 to 14, there are illustrated several modified forms of the washer-like fastening device made in accordance with the present invention. In such forms, the thread cutting projections may be made in accordance with the embodiment, as shown in FIGS. 2 and 2A, or may be made in accordance with the embodiment, shown in FIGS. 4 and 4A, dependent upon the relative thickness of the material employed. Accordingly, the following description for purposes of clarity will proceed with reference to the projections as being made in accordance with the embodiment shown in FIGS. 4 and 4A.

Figure 6:
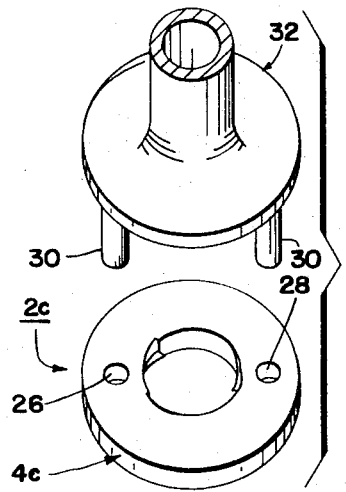
FIG. 6 is a generally perspective exploded view of another modification of the fastening device showing a portion of a tool for turning the device into self-threading engagement with a threadless member.

Accordingly, in FIG. 6 the fastening device 2c is generally similar to that shown in FIG. 3 with the suffix c added to the reference numerals to designate like parts, except in this form the body 4c is preferably circular in shape and is provided with a pair of oppositely disposed apertures 26 and 28 which extend axially therethrough. As shown, the apertures 26 and 28 are preferably circular in shape and are adapted to receive the spaced prongs 30 of a suitable tool 32 for turning the device into self-threading engagement with the threadless member S, as aforesaid.

Figures 7, 8:
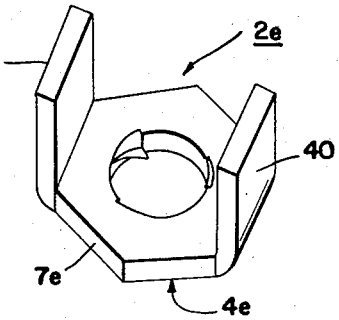
FIG. 7 is a generally perspective view of a further modification of the fastening device made in accordance with the invention.
FIG. 8 is a generally perspective view of another modification of the fastening device made in accordance with the invention.

In FIG. 7, there is shown another modification of the device 2d which is generally similar to that shown in FIG. 6 with a suffix d added to the reference numerals to designate like parts, except that in place of the aforementioned apertures 26 and 28 the body 4d of the device is preferably provided adjacent its outer peripheral edge 33 with a pair of oppositely disposed, generally arcuate slots 34 and 36. The slots 34 and 36 are also arranged to suitably accommodate the spaced prongs 30 of the tool 32, as aforesaid.

In FIG. 8 there is illustrated a further modification of the fastening device 2e which is generally similar to that shown in FIG. 3 with the suffix e added to the reference numerals to designate like parts, except that in this form the body 4e is preferably provided with a pair of oppositely disposed upstanding parallel wings 38 and 40. The wings 38 and 40 are preferably made integral with and extend generally at right angles from the general plane of the body 4e. Such arrangement is particularly advantageous in instances where the body 4e is made of an extremely thin material wherein it would be difficult to engage the outer peripheral edge surface 7e with a driving tool, especially after the device has been drawn into tight abutting engagement with a support member.

Figure 9:
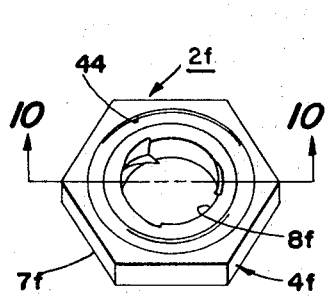
FIG. 9 is a generally perspective view of a further modification of the fastening device made in accordance with the invention.
Figure 10:
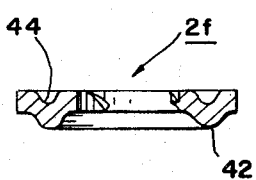
FIG. 10 is a cross-sectional view taken along the plane indicated by the line 10—10 of FIG. 9.

In FIGS. 9 and 10, there is illustrated another modification of the fastening device 2f which is generally similar to that shown in FIGS. 3 and 4 with the suffix f added to the reference numerals to designate like parts, except that in this form the body 4f is preferably provided on one side with an annular embossment 42 which is spaced inwardly from the outer peripheral edge surface 4f and which is spaced outwardly from and concentric relative to the central opening 8f provided in the body thereof. As best shown in FIG. 10, the embossment 42 is preferably of a concavo-convex construction so as to provide an annular recessed groove 44 on the opposite side of the body 4f. Such embossed construction, due to the work-hardening of the material during formation thereof, greatly enchances the strength and rigidity characteristics of the body 4f to prevent distortion or deformation thereof.

Figure 11:
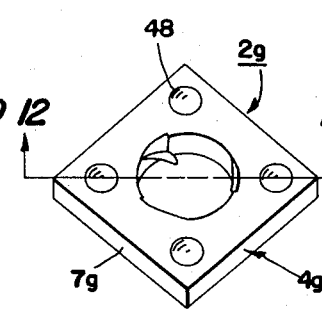
FIG. 11 is a generally perspective view of another modification of the fastening device made in accordance with the invention.
Figure 12:
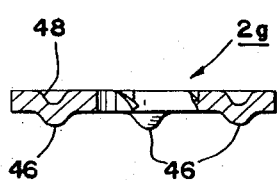
FIG. 12 is a cross-sectional view taken along the plane indicated by the line 12—12 of FIG. 11.

In FIGS. 11 and 12, there is illustrated another modification of the fastening device 2g which is generally similar to that shown in FIGS. 9 and 10 with the suffix g added to the reference numerals to designate like parts, except that in this form the body 4g is of a different polygonal shape so that the outer perhipheral edge surface 7g is of a square configuration. In the place of the continuous annular embossed construction, the body 4g is preferably provided with a single annular embossment 46 adjacent each of the corners thereof. As best shown in FIG. 12, each embossment 46 is preferably of a concavo-convex shape in cross-section providing a generally semi-circular depression 48 on the side opposite the raised embossment 46 so as to strengthen and rigidify the body 4g in the area adjacent the corners thereof.

Figure 13:
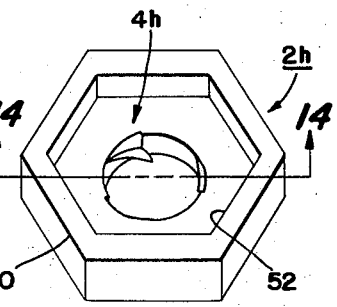
FIG. 13 is a generally perspective view of yet another modification of the fastening device made in accordance with the invention.
Figure 14:
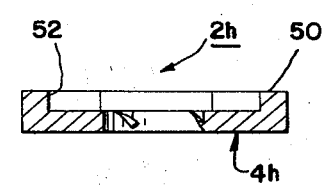
FIG. 14 is a cross-sectional view taken along the plane indicated by the line 14—14 of FIG. 13.

In FIGS. 13 and 14, there is shown a further modification of the fastening device 2h which is generally similar to that shown in FIGS. 9 to 12 with the suffix h added to the reference numerals to designate like parts, except that in this form the body 4h is preferably provided on one side thereof with an integral, polygonal rib 50 which is disposed adjacent the outer marginal edge surface thereof. As shown, the rib 50 is preferably provided to take the same shape as the body 4h, namely, the hexagonal shape shown. As best seen in FIG. 14, the rib 50 is preferably also polygonal, such as square shaped, in cross-section, having a thickness which is substantially the same as the thickness of the body 4h. Such rib construction completely encloses the body 4h on one side thereof to provide a convenient hexagonal recess 52 on such side so that a suitable driving tool (not shown) may be inserted therein for turning the device into self-threading engagement onto a threadless member 5. In addition, such rib construction greatly strengthens and rigidifies the relatively thin body 4h to prevent distortion or deformation thereof, for the purposes as aforesaid.

The terms and expressions which have been used, are terms of description and not of limitation, and there is no intention in the use of such terms and expressions of excluding any equivalents of any of the features shown or described, but it is recognized that various modifications are possible within the scope of the invention claimed in the appended claims.

I claim:

1. In a self-threading, washer-like fastening device for assembly with a threadless member comprising, a generally flat and relatively thin body, said body including substantially flat upper and lower surfaces having a generally cylindrical central opening therein, said opening being defined by an interior edge surface extending generally from said upper surface to said lower surface and defining an upper circumferential edge, said body having a plurality of circumferentially spaced cut-out portions interrupting said cylindrical surface and extending radially outwardly from said interior edge surface and downwardly from said upper surface in a general direction toward said lower surface, each cut-out portion having at least one side wall and a rear wall, an arcuate projection formed from the material of said body and forming a bottom for each of said cut-out portions, each projection including a leading end portion commencing at said upper circumferential edge and a trailing end portion disposed in an angularly downward direction from said leading end portion and terminating at said side wall, said leading end portion being disposed in the general plane of said interior edge surface and extending progressively inwardly toward said opening in a direction toward said trailing end portion with said trailing end portion being disposed outwardly of the general plane of said interior edge surface.

2. In a fastening device in accordance with claim 1, wherein the surface of said rear wall is generally concentric with the interior edge surface.

3. In a fastening device in accordance with claim 1, wherein said interior edge surface is generally tangent to said rear wall.

4. In a fastening device in accordance with claim 1, wherein said projections extend over substantially the full axial length of said interior edge surface.

5. In a fastening device in accordance with claim 1, wherein said projection increases in width from said leading end portion to said trailing end portion.

6. In a fastening device in accordance with claim 1, wherein said projection increases in thickness from said leading end portion toward said trailing end portion.

7. In a fastening device in accordance with claim 1, wherein each of said cut-out portions has a pair of spaced, oppositely disposed side surfaces and a generally arcuate rear surface connecting said side surfaces together.

8. In a fastening device in accordance with claim 1, wherein each of said cut-out portions has a single side surface and a generally arcuate rear surface, said rear surface extending from the interior edge surface of said opening to said side surface.

9. In a fastening device in accordance with claim 1, wherein said body includes embossment means projecting from one of said surfaces.

10. In a fastening device in accordance with claim 1, wherein said body includes at least one pair of oppositely disposed upstanding wing means made integral therewith extending upwardly from one of said surfaces and adapted for engagement by a turning tool.

11. In a fastening device in accordance with claim 1, wherein one surface of said body includes an upstanding closed rib made integral therewith, said rib providing a recessed area for the insertion of a turning tool therein.

12. In a fastening device in accordance with claim 1, wherein said body includes at least one pair of oppositely disposed apertures extending axially therethrough and spaced radially outwardly from said opening adapted for receiving a turning tool therein.

13. In a fastening device in accordance with claim 1, wherein said body includes at least one pair of oppositely disposed slots opening onto the outer marginal edge thereof adapted for receiving a turning tool therein.

References Cited

UNITED STATES PATENTS

| | | |
|---|---|---|
| 1,261,232 | 4/1918 | Hibbard. |
| 2,265,661 | 12/1941 | Luce _____ 151—38 |
| 2,294,056 | 8/1942 | Thompson. |
| 2,743,461 | 5/1956 | Urbas. |
| 2,896,495 | 7/1959 | Crawford. |
| 3,075,272 | 1/1963 | Buyken. |
| 3,283,639 | 11/1966 | Holton. |

FOREIGN PATENTS 1,994,552    6/1965    Germany.

MARION PARSON, JR., *Primary Examiner.*